(12) United States Patent
Sakhnini et al.

(10) Patent No.: US 12,177,006 B2
(45) Date of Patent: Dec. 24, 2024

(54) TECHNIQUES FOR DEVICE-ASSISTED WAVEFORM SELECTION IN WIRELESS COMMUNICATIONS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 12 days.

(21) Appl. No.: 17/203,380

(22) Filed: Mar. 16, 2021

(65) Prior Publication Data
US 2022/0303044 A1   Sep. 22, 2022

(51) Int. Cl.
*H04L 1/00* (2006.01)
*H04B 1/401* (2015.01)

(52) U.S. Cl.
CPC .......... *H04L 1/0003* (2013.01); *H04B 1/401* (2013.01); *H04L 1/0009* (2013.01)

(58) Field of Classification Search
CPC ......... H04L 2025/03426; H04L 25/067; H04L 25/0204; H04L 1/0054; H04L 27/38; H04L 27/2646; H04L 5/0091; H04L 27/2636; H04L 1/0003; H04L 1/0009; H04L 5/006; H04B 1/401
USPC ......................................................... 375/262
See application file for complete search history.

(56) References Cited

U.S. PATENT DOCUMENTS

| | | | |
|---|---|---|---|
| 10,523,358 B1* | 12/2019 | Park ................... | H04B 7/063 |
| 2016/0183234 A1* | 6/2016 | Sung .................. | H04W 72/046 |
| | | | 370/329 |
| 2018/0035423 A1* | 2/2018 | Wang .................. | H04L 5/0007 |
| 2018/0049233 A1 | 2/2018 | Luo et al. | |
| 2018/0092086 A1* | 3/2018 | Nammi ............ | H04L 27/26025 |
| 2018/0279361 A1* | 9/2018 | Yoo ..................... | H04W 72/23 |
| 2018/0294916 A1* | 10/2018 | Akkarakaran ....... | H04L 5/0092 |
| 2018/0332542 A1* | 11/2018 | Wang ................... | H04L 5/0091 |
| 2020/0036470 A1* | 1/2020 | Olesen ................ | H04L 1/0025 |
| 2020/0037254 A1* | 1/2020 | Comsa ............... | H04W 52/365 |
| 2021/0007095 A1* | 1/2021 | Eldessoki ........... | H04L 5/0069 |
| 2022/0376965 A1* | 11/2022 | Ramirez-Gutierrez ..................... | H04W 72/23 |

FOREIGN PATENT DOCUMENTS

WO    2018026546 A1    2/2018

OTHER PUBLICATIONS

International Search Report and Written Opinion—PCT/US2022/070801—ISA/EPO—Jun. 13, 2022.

* cited by examiner

*Primary Examiner* — Syed Haider
(74) *Attorney, Agent, or Firm* — Arent Fox Schiff LLP

(57) ABSTRACT

Aspects described herein relate to switching waveforms in a waveform switching gap. In an aspect, using a transceiver, a first signal of a first waveform can be communicated. Assistance information related to switching the transceiver to use a second waveform can be communicated as well, and based at least in part on the assistance information, the transceiver can be switched to use a second waveform. Using the transceiver, a second signal of a second waveform can be communicated.

30 Claims, 6 Drawing Sheets

TECHNIQUES FOR DEVICE-ASSISTED WAVEFORM SELECTION IN WIRELESS COMMUNICATIONS

BACKGROUND

Aspects of the present disclosure relate generally to wireless communication systems, and more particularly, to switching between waveforms used in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, devices, including user equipment (UE) or base stations (e.g., gNBs), can switch between different waveforms in communicating with one another.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to communicate, using the transceiver, a first signal of a first waveform in a first time period, transmit, to a base station, assistance information related to switching the transceiver to use a second waveform, switch, based at least in part on transmitting the assistance information, the transceiver to use a second waveform, and communicate, using the transceiver, a second signal of a second waveform in a second time period.

According to an aspect, an apparatus for wireless communication is provided that includes a transceiver, a memory configured to store instructions, and one or more processors communicatively coupled with the memory and the transceiver. The one or more processors are configured to communicate, using the transceiver, a first signal of a first waveform in a first time period, receive, from a user equipment (UE), assistance information related to switching the transceiver to use a second waveform, switch, based at least in part on receiving the assistance information, the transceiver to use a second waveform, and communicate, using the transceiver, a second signal of a second waveform in a second time period.

In another aspect, a method of wireless communication is provided. The method includes communicating, using a transceiver, a first signal of a first waveform in a first time period, transmitting, to a base station, assistance information related to switching the transceiver to use a second waveform, switching, based at least in part on transmitting the assistance information, the transceiver to use a second waveform, and communicating, using the transceiver, a second signal of a second waveform in a second time period.

In another aspect, a method of wireless communication is provided. The method includes communicating, using a transceiver, a first signal of a first waveform in a first time period, receiving, from a UE, assistance information related to switching the transceiver to use a second waveform, switching, based at least in part on receiving the assistance information, the transceiver to use a second waveform, and communicating, using the transceiver, a second signal of a second waveform in a second time period.

According to another aspect, an apparatus for wireless communication is provided that includes means for communicating, using a transceiver, a first signal of a first waveform in a first time period, means for transmitting, to a base station, assistance information related to switching the transceiver to use a second waveform, means for switching, based at least in part on transmitting the assistance information, the transceiver to use a second waveform, and means for communicating, using the transceiver, a second signal of a second waveform in a second time period.

According to another aspect, an apparatus for wireless communication is provided that includes means for communicating, using a transceiver, a first signal of a first waveform in a first time period, means for receiving, from a UE, assistance information related to switching the transceiver to use a second waveform, means for switching, based at least in part on receiving the assistance information, the transceiver to use a second waveform, and means for communicating, using the transceiver, a second signal of a second waveform in a second time period.

In another aspect, a computer-readable medium including code executable by one or more processors for wireless communication is provided. The code includes code for communicating, using a transceiver, a first signal of a first waveform in a first time period, transmitting, to a base station, assistance information related to switching the transceiver to use a second waveform, switching, based at least in part on transmitting the assistance information, the transceiver to use a second waveform, and communicating, using the transceiver, a second signal of a second waveform in a second time period.

In another aspect, a computer-readable medium including code executable by one or more processors for wireless communication is provided. The code includes code for communicating, using a transceiver, a first signal of a first waveform in a first time period, receiving, from a UE, assistance information related to switching the transceiver to use a second waveform, switching, based at least in part on receiving the assistance information, the transceiver to use a second waveform, and communicating, using the transceiver, a second signal of a second waveform in a second time period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
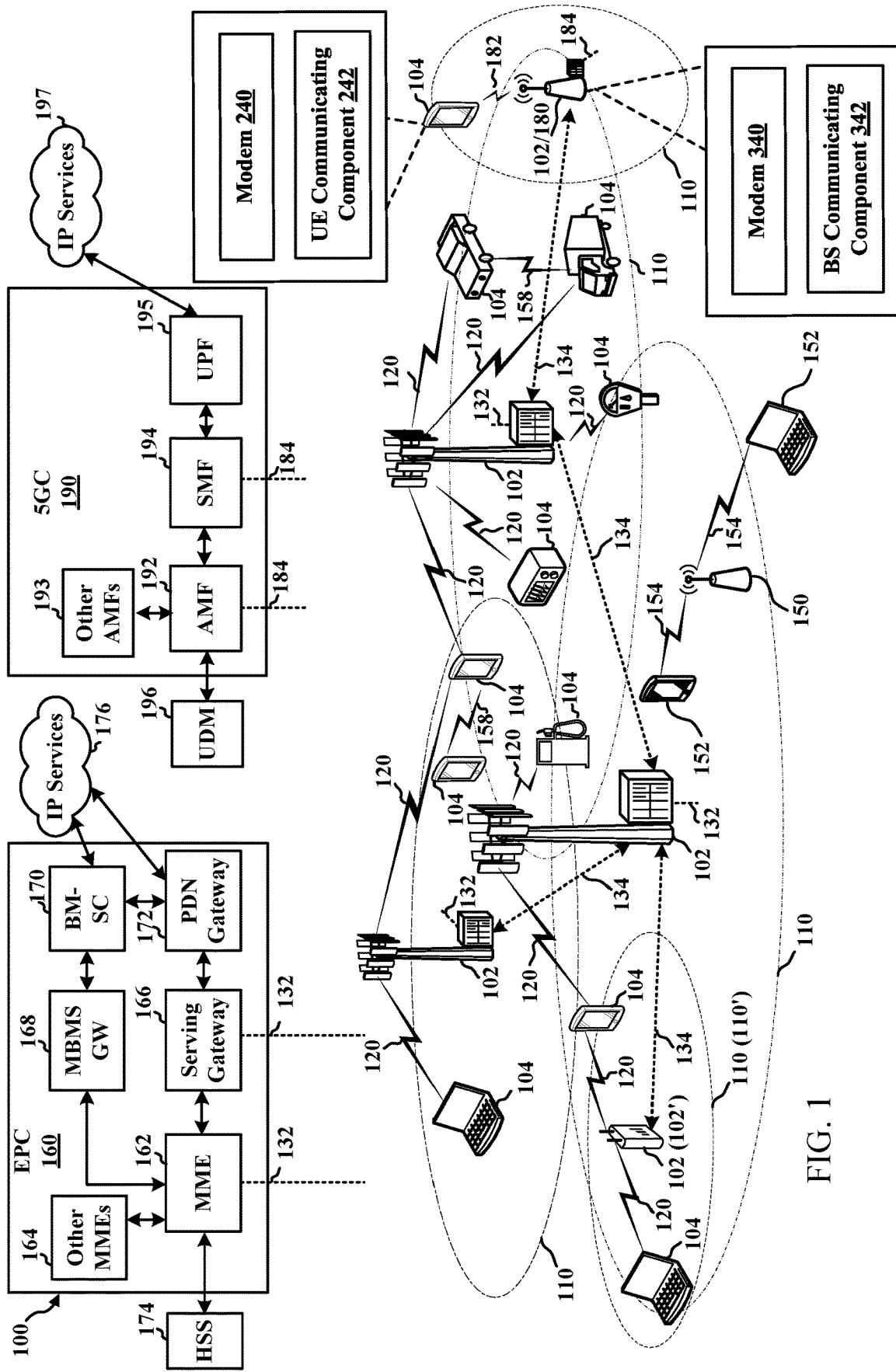
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing device-assisted waveform switching in wireless communications. For example, in wireless communication technologies such as fifth generation (5G) new radio (NR), higher operating bands with larger bandwidths are being implemented. For a larger BW, several waveforms can be used (e.g., for the downlink (DL) operation, such as orthogonal frequency division multiplexing (OFDM), single carrier frequency domain implementation (e.g., discrete Fourier transform-spread-OFDM (DFT-s-OFDM)), single carrier time domain implementation (e.g., single carrier-quadrature amplitude modulation (SC-QAM)), etc. For example, single carrier frequency domain implementations can provide low peak-to-average power ratio (PAPR) (e.g., improved coverage), Single tap frequency domain equalization (FDE), efficient bandwidth (BW) utilization (e.g., no guard band needed). In another example, single carrier time domain implementation can provide low PAPR, low complexity implementation (e.g., no fast Fourier transform (FFT)/inverse FFT (IFFT) needed), etc. In another example, OFDM can provide higher PAPR, high signal-to-noise ratio (SNR), high spectral efficiency, high order multiple-input multiple-output (MIMO) to achieve extremely high data rate, single tap FDE, efficient BW utilization (e.g., no guard band needed), easy frequency division multiplexing (FDM) capability, etc.

As such, for example, at least for a higher band operation, the conditions may not always be ideal for a certain waveform and changing between waveforms may be desirable. For example, a device (e.g., a user equipment (UE) or base station—e.g., gNB—in 5G NR) can change between waveforms based on certain considerations, such as transmit power requirements, FDM requirements, MIMO requirements, etc. of associated communications. For example, cell edge UEs may have low SNR, may be power limited, may not need MIMO, etc., and SC may be an optimal or desirable waveform. In another example, UEs with good (e.g., at least a threshold) SNR can have multi-path rich channels and can use higher order MIMO (especially when they are not power limited); in such cases, OFDM may be the optimal or desirable waveform. A base station or other device providing control data to or scheduling a UE, can indicate to the UE to switch a waveform; however, in examples described herein, the UE may assist in determining to switch the waveform and/or determining to which waveform to switch (e.g., an optimal waveform to be used). Though generally described in terms of 5G NR, devices using substantially any wireless communication technology can implement device-assisted waveform switching using the concepts described herein.

In an aspect, a device can send assistance information to another device with which the device is communicating to assist the other device in determining to switch a waveform for the device, determining a waveform to which to switch, etc. For example, the device can be a UE, and the other device can be a base station 102 or other device communicating with a backend wireless network, another UE in sidelink communications, etc. In an example, the device can send the assistance information as related to uplink communications, downlink communications, or both. For example, the device can provide the assistance as explicit information or implicit information regarding to which waveform to switch. In addition, for example, the device can report the assistance information in a periodic or aperiodic (or event-based) report. In another example, the device can report the assistance information in an explicit or implicit report. In yet another example, the device can report assistance information pursuant to a hysteresis or backoff timer to prevent frequent waveform switching.

Accordingly, in various examples described herein, devices can provide the assistance information to indicate that the device may benefit from a waveform switch, to assist in the waveform switching by providing information to allow the other device to determine to switch the waveform or make an informed decision on to which waveform to switch, etc. Using device-assisted waveform switching, in this regard, can help to ensure that devices perform waveform switching in certain scenarios where the switch may be beneficial and/or switch to waveforms that improve communication properties of the device, which can improve communication throughput, and thus user experience, in using the devices.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for providing assistance information for switching waveforms, in accordance with aspects described herein. In addition, some nodes may have a modem 340 and BS communicating component 342 for switching waveforms, or configuring devices for switching waveforms, based on received assistance information, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can communicate with one or more other devices in the wireless network, such as one or more base station 102, one or more other UEs 104, etc., using a first waveform. UE communicating component 242 can provide assistance information to one or more other devices to indicate or cause switching to a second waveform for communicating with the one or more other devices. For example, UE communicating component 242 can transmit assistance information to the one or more devices, such as a base station 102, indicating a waveform to which to switch, parameters for determining a waveform, etc. In an example, BS communicating component 342 can receive the assistance information and determine to switch waveforms and/or a waveform to which to switch based on the assistance information. In an example, BS communicating component 342 can configure the UE 104 to switch the waveform as well.

Figure 2:
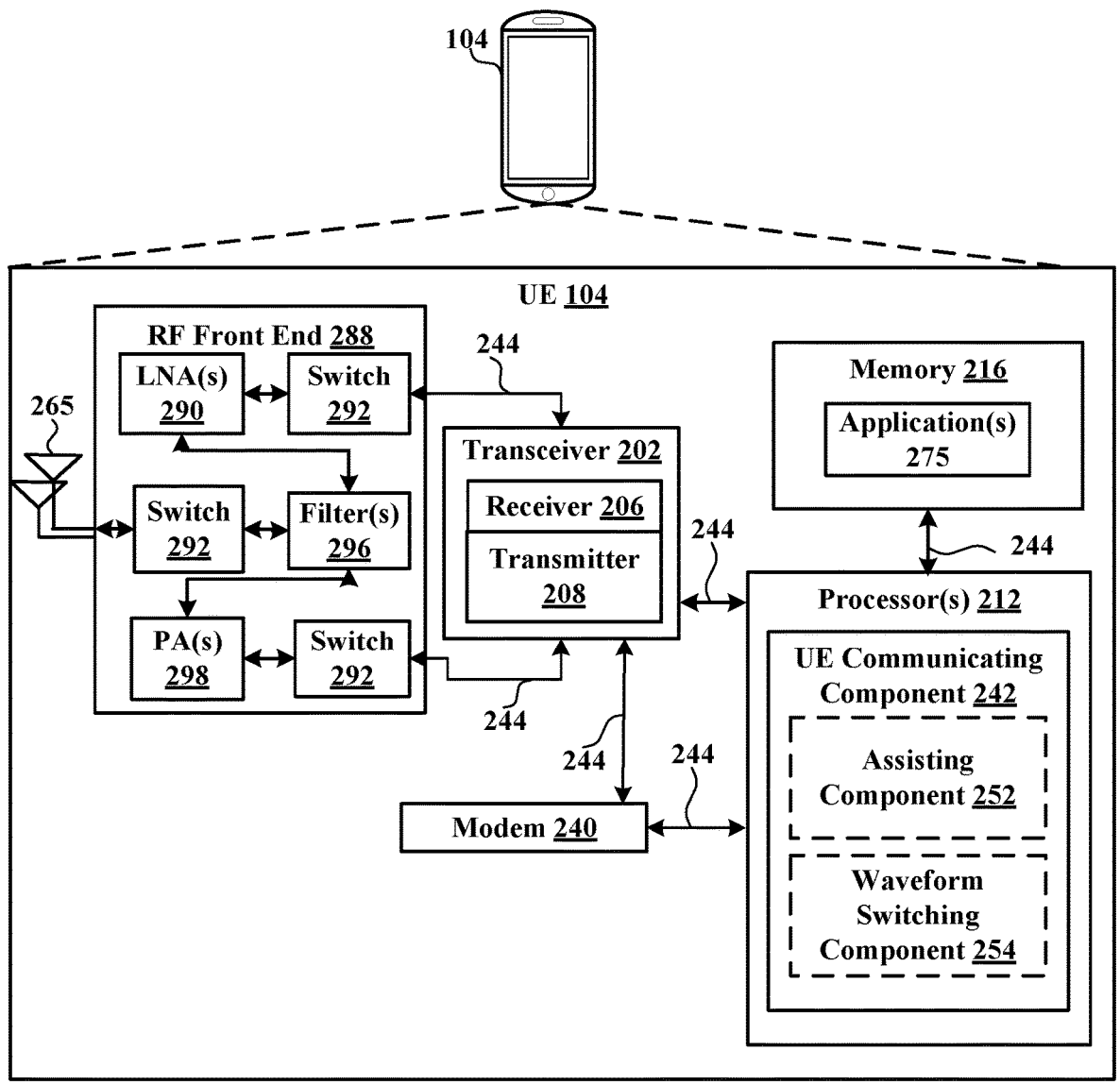
FIG. 2 is a block diagram illustrating an example of a UE, in accordance with various aspects of the present disclosure.
Figure 3:
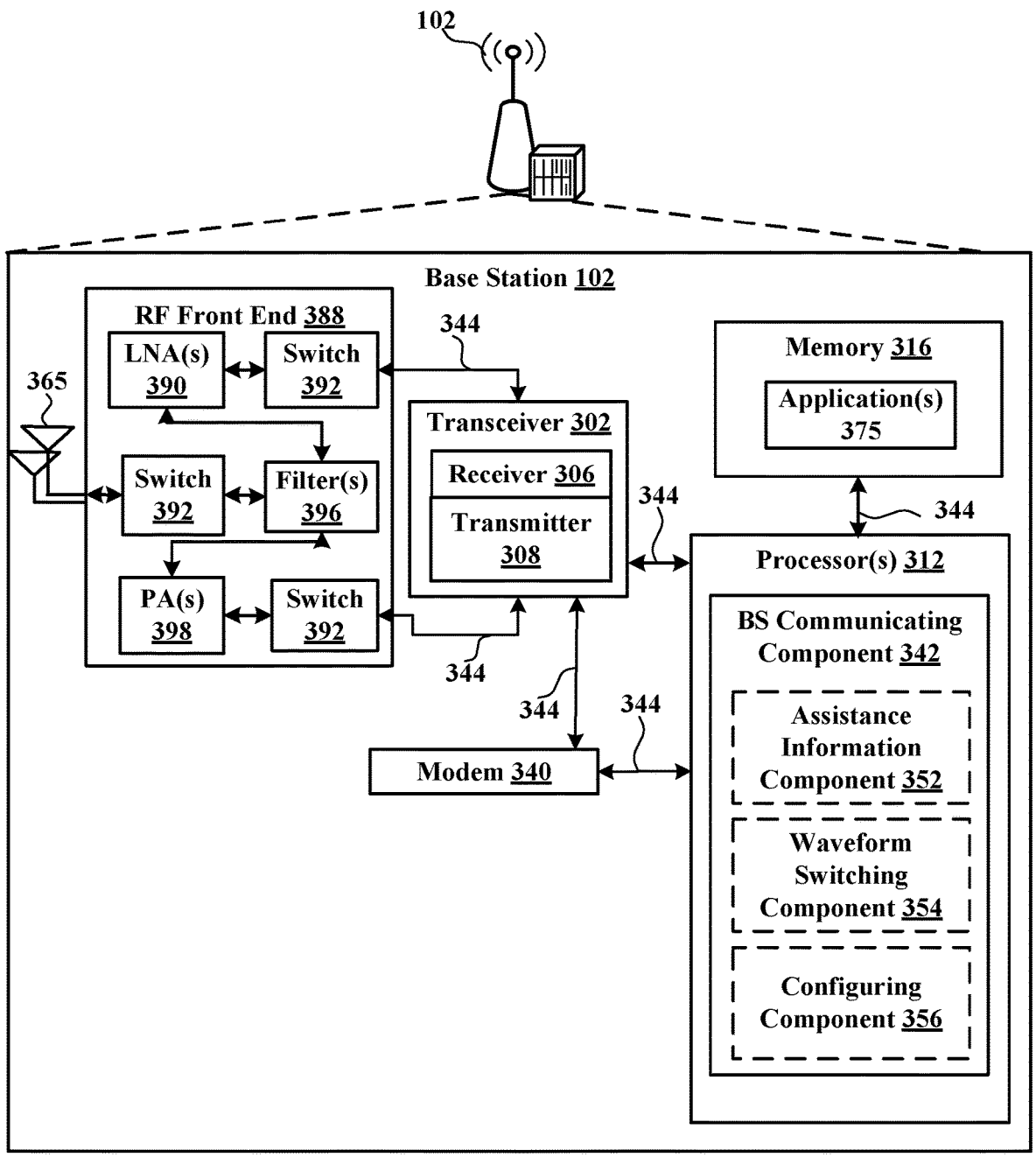
FIG. 3 is a block diagram illustrating an example of a base station, in accordance with various aspects of the present disclosure.
Figure 4:
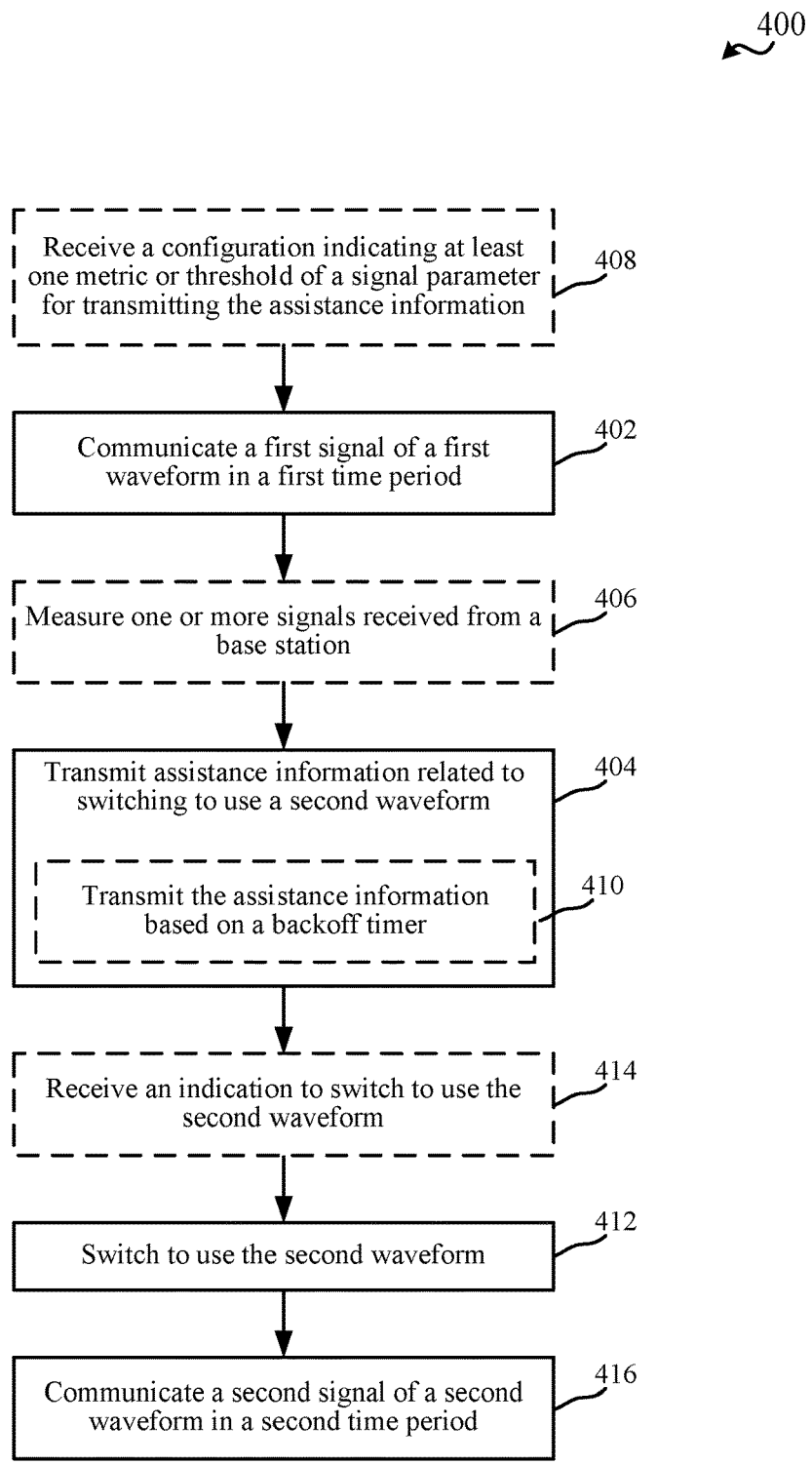
FIG. 4 is a flow chart illustrating an example of a method for switching waveforms, in accordance with aspects described herein.
Figure 5:
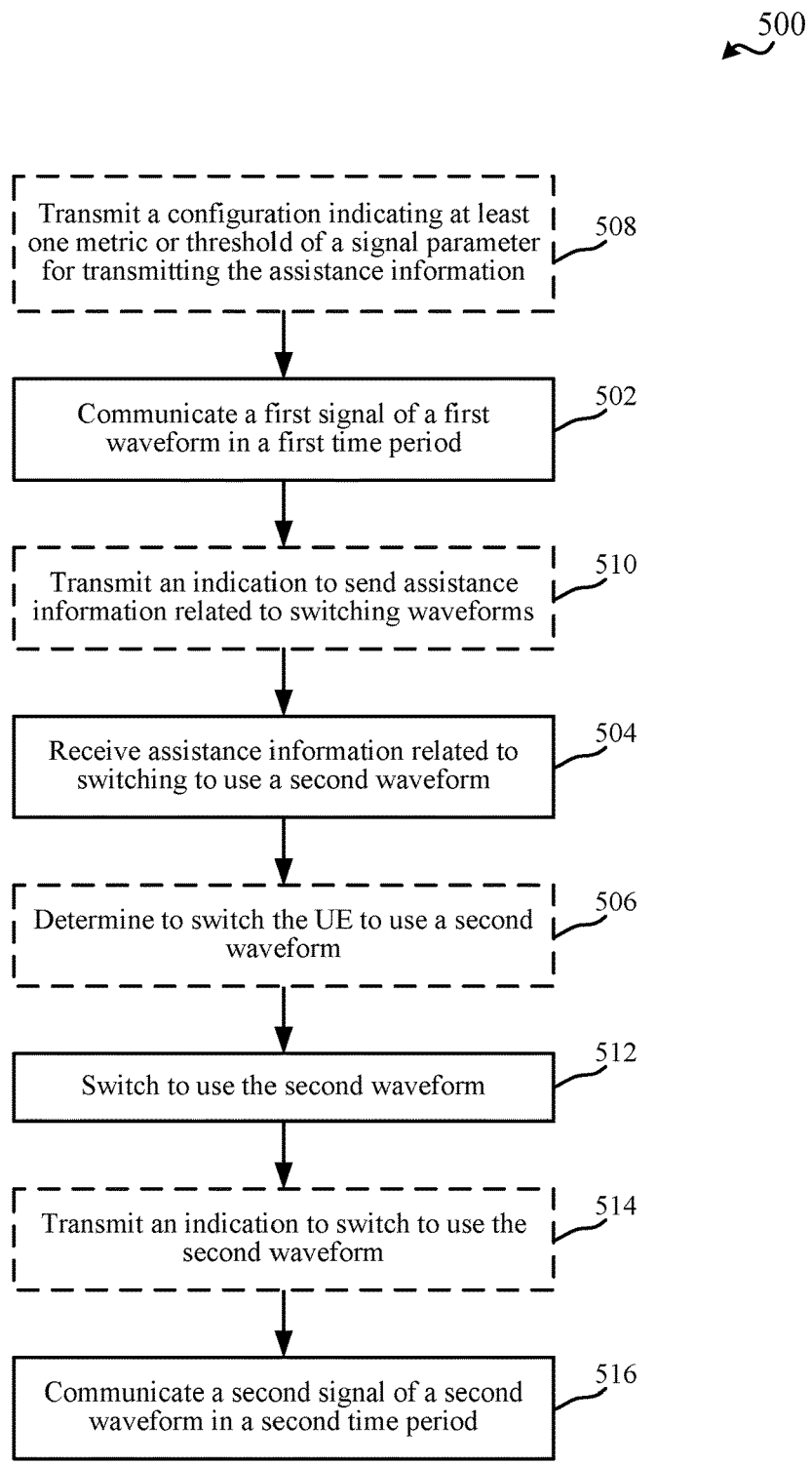
FIG. 5 is a flow chart illustrating an example of a method for switching waveforms and/or configuring a device to switch waveforms, in accordance with aspects described herein.

Turning now to FIGS. 2-6, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for providing assistance information for switching waveforms, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include an assisting component 252 for determining or providing assistance information related to performing waveform switching, and/or a waveform switching component 254 for switching among waveforms in communicating with one or more devices, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for switching waveforms, or configuring devices for switching waveforms, based on received assistance information, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include an assistance information component 252 for receiving or processing assistance information for determining to performing waveform switching, a waveform switching component 354 for switching, based on the assistance information, among waveforms for communicating with one or more devices, and/or a configuring component 356 for configuring one or more devices for reporting assistance information for waveform switching, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for switching waveforms, in accordance with aspects described herein. In an example, a UE 104 can perform the functions described in method 400 using one or more of the components described in FIGS. 1-2.

In method 400, at Block 402, a first signal of a first waveform in a first time period can be communicated. In an aspect, UE communicating component 242, e.g., in conjunction with processor(s) 212, memory 216, transceiver 202, etc., can communicate the first signal of the first waveform in the first time period. In one example, UE communicating component 242 can communicate the first signal by transmitting the first signal of the first waveform to another device (e.g., a base station 102, another UE, etc.). In another example, UE communicating component 242 can communicate the first signal by receiving the first signal of the first waveform from another device (e.g., a base station 102, another UE, etc.). In an example, UE 104 can be configured with resources for communicating the first signal, which can include receiving a resource grant from the base station 102 that indicates the resources for transmitting or receiving the first signal.

For example, the first waveform can include OFDM, DFT-s-OFDM, SC-QAM, etc., as described. In this regard, for example, UE communicating component 242 can generate a waveform for transmission based on performing a transform of data modulated symbols to be transmitted, such as FFT, IFFT, DFT, etc., to map the symbols to time and frequency resources for transmitting. Similarly, in an example, UE communicating component 242 can process a waveform received from another device based on performing a transform (or inverse transform) to recover the data modulated symbols, such as FFT, IFFT, DFT, etc.

In method 400, at Block 404, assistance information related to switching to use a second waveform can be transmitted. In an aspect, assisting component 252, e.g., in conjunction with processor(s) 212, memory 216, transceiver 202, UE communicating component 242, etc., can transmit assistance information related to switching to use a second waveform. For example, assisting component 252 can transmit the assistance information to a base station 102 or other device (e.g., another UE), where the base station 102 or other device can schedule the UE 104 for communicating therewith. In this regard, the base station 102 or other device can receive the information and determine whether or when to switch waveforms for communicating with the UE 104. The assistance information can include substantially any information or parameters that can assist the node, to which the assistance information is transmitted, in determining whether or when to switch waveforms for communicating with the UE 104, to which waveform to switch in certain scenarios, etc.

In an example, the assistance information may include, or may be based on, measurements of signals received from the base station 102 or other device. Thus, for example in method 400, optionally at Block 406, one or more signals received from a base station can be measured. In an aspect, assisting component 252, e.g., in conjunction with processor(s) 212, memory 216, transceiver 202, UE communicating component 242, etc., can measure the one or more signals received from the base station 102 (or other device). For example, UE 104 can measure signal strength or quality metrics of signals received from the base station 102 or other devices and report the metrics (e.g., the metric values) to the base station 102 or other devices. For example, the metrics may include one or more of a received signal strength indicator (RSSI), reference signal received power (RSRP), reference signal received quality (RSRQ), signal-to-noise ratio (SNR), signal-to-interference-and-noise ratio (SINR), or other measurements of reference signals (e.g., common reference signal (CRS), demodulation reference signal (DM-RS), etc.) or other signals received from the base station 102 or other devices. In another example, the UE 104 can measure the metric(s) and send other assistance information (e.g., information other than the metric values) to the base station 102 or other device.

In one example, the assistance information can include a recommended waveform to which to switch, which assisting component 252 can determine based on the measurements. For example, where signal metrics as measured achieve a threshold, assisting component 252 may determine to use DFT-s-OFDM waveform, and may transmit, to the base station 102 or other device, a request a switch to DFT-s-OFDM waveform (e.g., where DFT-s-OFDM is currently not being used). In addition, in this example, assisting component 252 can transmit the assistance information including an explicit indication of the waveform or an implicit indication of the waveform to which switching is requested or otherwise indicated.

For example, the UE assistance may be explicit such that the UE 104 based on its measurements, recommends one or more waveform(s) to the network (e.g., to the base station 102 or other device). In an example, rules for reporting a particular waveform may be specified, signaled to the UE 104 (e.g., in a configuration), implemented in the UE 104 (e.g., in instructions stored in memory 216), a combination thereof, etc., where the rules may indicate the metrics to be measured (e.g., the type of measurement, such as RSSI, RSRP, RSRQ, SNR, or SINR, etc., the type of signal to be measured, resources over which signals are to be measured, threshold values for determining a type of waveform to use, etc.). Thus, for example in method 400, optionally at Block 408, a configuration indicating at least one metric or threshold of a signal parameter for transmitting the assistance information can be received. In an aspect, assisting component 252, e.g., in conjunction with processor(s) 212, memory 216, transceiver 202, UE communicating component 242, etc., can receive the configuration indicating at least one metric or threshold of the signal parameter for transmitting the assistance information. For example, assisting component 252 can receive the configuration in radio resource control (RRC) signaling, media access control (MAC)-control element (CE), downlink control information (DCI), etc. from the base station 102 or other device. The configuration can indicate the rules for determining a particular waveform to which to switch, as described above.

In any case, as described, assisting component 252 can measure the one or more signals from the base station, and can determine, based on the measurement, whether one or more certain metrics or one or more certain signals achieve one or more thresholds. If so, assisting component 252 can determine a waveform to use in communicating with the base station 102 or other device. Where the UE 104 is not currently using this waveform, assisting component 252 can transmit, to the base station 102 or other device, assistance information indicating an explicit or implicit request to switch to the waveform for subsequent communications. In an example, the waveform request or recommendation may be for a single waveform to which to switch. In another example, the waveform request or recommendation may be for more than one waveform to which to switch in a specific recommended order. In this example, the base station 102 or other device can select among the multiple waveforms in determining the waveform for the UE 104, where this determination by the base station 102 or other device may be based on other considerations, measurements, etc. by the base station 102 or other device.

In another example, the UE assistance may be implicit in indicating a waveform, such that the UE 104 reports that assistance information to include specific information (e.g., measurement values), and the network (e.g., the base station 102 or other device) decides based on this information whether to switch waveforms for the UE 104. For example, assisting component 252 can transmit the assistance information as, or to be the same as, the current channel state information (CSI) feedback transmitted to the base station 102 (e.g., MIMO rank, power headroom, etc.), a newly defined measurement (e.g., UE processing power remaining, which may be related to FFT operations, adjacent channel leakage ratio (ACLR), etc.), from which a waveform to which to switch, or whether to switch to a different waveform in the first place, can be determined by the base station 102 or other device.

Moreover, in an example, assisting component 252 can transmit the assistance information in a periodic report, an aperiodic report, an event-based report, etc. In one example, a configuration received from the base station 102 or other device (e.g., at Block 408 or otherwise) may indicate a period for transmitting the assistance information report (e.g., a start time, a period between transmissions, etc.), and assisting component 252 can transmit the assistance information at the start time and according to a periodic timer that is initialized based on the indicated period, etc. In another example, assisting component 252 can receive an aperiodic trigger to transmit assistance information, where the trigger may be received from a base station 102 or other device in MAC-CE, DCI, etc. In yet another example, assisting component 252 can determine, whether based on a configuration received from the base station 102 or other device (e.g., at Block 408 or otherwise), based on instructions stored in memory 216, etc. one or more conditions for reporting the assistance information. For example, the one or more conditions may relate to channel quality or radio environment considerations observed by the UE 104, a throughput at the UE 104, a processing power available at the UE 104, a buffer status of the UE 104, etc. In this example, transmitting the assistance information at Block 404 may be based on assisting component 252 detecting the one or more conditions.

In another example, the assistance information report may be explicitly or implicitly signaled. For example, assisting component 252 can transmit explicit assistance information on an uplink channel, such as physical uplink control channel (PUCCH), physical uplink shared channel (PUSCH), etc. In an example, assisting component 252 can transmit the assistance information as a standalone transmission over the uplink channel or multiplexed with other uplink communications, such as with existing CSI reports. In another example, assisting component 252 can transmit implicit assistance information as related to a specific uplink message or confirmation of an uplink message. For example, assisting component 252 can select specific resources or message contents for transmitting a message to the base station 102 or other device to indicate the assistance information. In an example, assisting component 252 can transmit implicit assistance information by selecting specific PUCCH resources (e.g., time/frequency resources) for transmitting PUCCH to the base station 102 or other device, selecting a specific physical random access channel (PRACH) sequence or preamble for transmitting to the base station 102 or other device, etc. For example, the selection of PUCCH resources or PRACH sequence can be used to indicate a specific waveform to which switching is requested by the UE 104. Moreover, for example, assisting component 252 can determine which PUCCH resources or PRACH sequences to use, etc. to indicate certain waveforms based on a configuration received from the base station 102 or other device, based on a configuration stored in memory 216, etc.

In transmitting the assistance information at Block 404, optionally at Block 410, the assistance information can be transmitted based on a backoff timer. In an aspect, assisting component 252, e.g., in conjunction with processor(s) 212, memory 216, transceiver 202, UE communicating component 242, etc., can transmit the assistance information based on a backoff timer. For example, the backoff timer, or hysteresis value, can be configured to prevent frequent assistance information reporting and/or corresponding waveform switching. In a specific example, assisting component 252 can configure the backoff timer between waveform reports whenever a waveform switch is recommended, or whenever the assisting component 252 transmits associated assistance information to the base station 102 or other device. For example, if a UE 104 transmits assistance information or reports a waveform switch, it cannot send another report or assistance information to indicate a switch before the backoff timer elapses. In an example, a value for the backoff timer can be determined from a configuration (e.g., the configuration received at Block 406 or other configuration), determined from memory 216, etc.

In any case, in an example, based on transmitting the assistance information, the UE 104 can switch to use the second waveform. In method 400, at Block 412, a second waveform can be switched to. In an aspect, waveform switching component 254, e.g., in conjunction with processor(s) 212, memory 216, transceiver 202, UE communicating component 242, etc., can switch to use a second waveform. For example, waveform switching component 254 can switch from the first waveform to the second waveform, which can include switching from one of OFDM, DFT-s-OFDM, SC-QAM, to another one of OFDM, DFT-s-OFDM, SC-QAM, etc. In an example, waveform switching component 254 can switch the transceiver 202 to use the second waveform in transmitting or receiving communications, which can include switching components used to process signals before transmission or after reception, switching operations or calculations used to generate signals for transmission or decode received signals, and/or the like. In one example, transceiver 202 can have multiple transmit or receive chains that have different components for generating different waveforms, and waveform switching component 254 can switch the transceiver to use a certain transmit or receive chain to effectuate the switch from using the first waveform to using the second waveform. For example, waveform switching component 254 can switch to the waveform recommended in the assistance information, which may be performed based on transmitting the assistance information and/or based on receiving a response to transmission of the assistance information (e.g., confirming the switch or indicating the waveform to which to switch).

In an example in method 400, optionally at Block 414, an indication to switch to use the second waveform can be received. In an aspect, waveform switching component 254, e.g., in conjunction with processor(s) 212, memory 216, transceiver 202, UE communicating component 242, etc., can receive the indication to switch to use the second waveform (e.g., from the base station 102 or other device, etc.). For example, waveform switching component 254 can receive the indication in DCI, MAC-CE, etc., where the indication may indicate to switch to the recommended waveform or may explicitly indicate a waveform to which to switch (e.g., where the base station 102 or other device can make the final decision on waveform). In an example, the indication may specify a time period for switching to the waveform, a time period to use the waveform (e.g., before switching back to another waveform), a backoff timer value for initializing the backoff timer for sending subsequent assistance information, etc. In any case, waveform switching component 254 can switch the waveform to use based on the received indication, in this example.

In method 400, at Block 416, a second signal of the second waveform can be communicated in a second time period. In an aspect, UE communicating component 242, e.g., in conjunction with processor(s) 212, memory 216, transceiver 202, etc., can communicate the second signal of the second waveform in the second time period. In one example, UE communicating component 242 can communicate the second signal by transmitting the second signal of the second waveform to another device (e.g., a base station 102, another UE, etc.) based on switching to use the second waveform. In another example, UE communicating component 242 can communicate the second signal by receiving the second signal of the second waveform from another device (e.g., a base station 102, another UE, etc.) based on switching to use the second waveform. In an example, UE 104 can be configured with resources for communicating the second signal, which can include receiving a resource grant from the base station 102 that indicates the resources for transmitting or receiving the second signal. In addition, for example, UE communicating component 242 can communicate the second signal with the same one or more devices with which the UE communicating component 242 communicates the first signal. Moreover, as described for example, the second waveform can include OFDM, DFT-s-OFDM, SC-QAM, etc., as described, and can be different than the first waveform.

FIG. 5 illustrates a flow chart of an example of a method 500 for switching waveforms and/or configuring a device to switch waveforms, in accordance with aspects described herein. In an example, a base station 102 or other device (e.g., a transmitting UE in sidelink communications) can perform the functions described in method 500 using one or more of the components described in FIGS. 1-3.

In method 500, at Block 502, a first signal of a first waveform in a first time period can be communicated. In an aspect, BS communicating component 342, e.g., in conjunction with processor(s) 312, memory 316, transceiver 302, etc., can communicate the first signal of the first waveform in the first time period, similarly as described above with respect to Block 402 of method 400. In one example, BS communicating component 342 can communicate the first signal by transmitting the first signal of the first waveform to another device (e.g., a UE, etc.). In another example, BS communicating component 342 can communicate the first signal by receiving the first signal of the first waveform from another device (e.g., a UE, etc.). In an example, BS 102 can configure the other device with resources for communicating the first signal, as described. Moreover, as described, the first waveform can include OFDM, DFT-s-OFDM, SC-QAM, etc.

In method 500, at Block 504, assistance information related to switching to use a second waveform can be received. In an aspect, assistance information component 352, e.g., in conjunction with processor(s) 312, memory 316, transceiver 302, BS communicating component 342, etc., can receive assistance information related to switching to use a second waveform. For example, assistance information component 352 can receive the assistance information from a UE 104, where the assistance information relates to the UE 104 switching waveforms in wireless communications. In one example, the base station 102 can schedule the UE 104 for communicating therewith, and in an example, can control the waveform used by the UE 104. The base station 102 can determine to switch the UE 104 to use another waveform based on received assistance information, as described herein.

Thus, in an example in method 500, optionally at Block 506, it can be determined to switch the UE to use a second waveform. In an aspect, waveform switching component 354, e.g., in conjunction with processor(s) 312, memory 316, transceiver 302, BS communicating component 342, etc., can determine to switch the UE to use the second waveform, where this determination may be based on the received assistance information. In another example, the UE 104 can switch to use the second waveform based on sending the assistance information, and waveform switching component 354 can correspondingly switch the waveform used by the base station 102. Where the base station 102 determines the waveform switch, for example, waveform switching component 354 can determine one or more of a waveform to which to switch the base station 102 and/or UE 104, when or whether to perform the waveform switching at the base station 102 and/or UE 104 in the first place, etc. As described, for example, the assistance information can include substantially any information or parameters that can assist the base station 102 in determining whether or when to switch waveforms for communicating with the UE 104, to which waveform to switch in certain scenarios, etc.

In an example, the assistance information may include, or may be based on, measurements of signals performed by the UE 104. The assistance information may include values of signal measurement metrics, such as RSSI, RSRP, RSRQ, SNR, SINR, or other measurements of reference signals (e.g., CRS, DM-RS, etc.) or other signals received from the base station 102. In this example, waveform switching component 254 can determine to switch the UE to use a second waveform, and/or the second waveform to which to switch, based on the signal measurement metrics. For example, where signal metrics as measured achieve a threshold, waveform switching component 354 may determine to use DFT-s-OFDM waveform, and may switch to use DFT-s-OFDM waveform (e.g., where DFT-s-OFDM is currently not being used) in communicating with the UE 104.

In another example, assistance information component 352 can receive the assistance information including an explicit indication of the waveform or an implicit indication of the waveform to which switching is requested or otherwise indicated by the UE 104. Waveform switching component 354 may determine to switch to the recommended waveform, or another waveform, based on the explicit or implicit indication. For example, the UE assistance may be explicit such that the UE 104 based on its measurements, recommends one or more waveform(s) to the network (e.g., to the base station 102 or other device). In an example, rules for reporting a particular waveform may be specified, signaled to the UE 104 (e.g., in a configuration transmitted by the base station 102), etc., where the rules may indicate the metrics to be measured (e.g., the type of measurement, such as RSSI, RSRP, RSRQ, SNR, or SINR, etc., the type of signal to be measured, resources over which signals are to be measured, threshold values for determining a type of waveform to use, etc.). Thus, for example in method 500, optionally at Block 508, a configuration indicating at least one metric or threshold of a signal parameter for transmitting the assistance information can be transmitted. In an aspect, assistance information component 352, e.g., in conjunction with processor(s) 312, memory 316, transceiver 302, BS communicating component 342, etc., can transmit the configuration indicating at least one metric or threshold of the signal parameter for transmitting the assistance information (e.g., to the UE 104). For example, assistance information component 352 can transmit the configuration in RRC signaling, MAC-CE, DCI, etc. to the UE 104. The configuration can indicate the rules for determining a particular waveform to which to switch, as described above.

In another example, the UE assistance may be implicit in indicating a waveform, such that the UE 104 reports that assistance information to include specific information (e.g., measurement values), and the base station 102 decides based on this information whether to switch waveforms for the UE 104. For example, assistance information component 352 can receive the assistance information as, or to be the same as, the current CSI feedback transmitted by the UE 104 (e.g., MIMO rank, power headroom, etc.), a newly defined measurement (e.g., UE processing power remaining, which may be related to FFT operations, adjacent channel leakage ratio (ACLR), etc.), etc. In this example, waveform switching component 354 can determine a waveform to which to switch, or whether to switch to a different waveform in the first place, for the UE 104, based on the received CSI or other measurements (e.g., UE processing power, ACLR, etc.). As described, for example, waveform switching component 354 can compare the measurements to one or more thresholds to determine the waveform and/or whether to switch the waveform (and/or whether to instruct the UE 104 to switch the waveform). For example, waveform switching component 354 can determine to switch the waveform from OFDM to DFT-s-OFDM where the UE has sufficient processing power (e.g., based on comparing the reported UE processing power to a threshold) or where the ACLR is low (e.g., below a threshold), etc.

Moreover, in an example, assistance information component 352 can receive the assistance information in a periodic report, an aperiodic report, an event-based report, etc. In one example, a configuration transmitted to the UE 104 (e.g., at Block 508 or otherwise) may indicate a period for transmitting the assistance information report (e.g., a start time, a period between transmissions, etc.), and assistance information component 352 can receive the assistance information at the start time and according to a periodic timer that is initialized based on the indicated period, etc. In another example, assistance information component 352 can transmit an aperiodic trigger to transmit assistance information, where the trigger may be transmitted to the UE 104 in MAC-CE, DCI, etc. In yet another example, assistance information component 352 can transmit, to the UE 104, a configuration (e.g., at Block 508 or otherwise) indicating one or more conditions for reporting the assistance information. For example, the one or more conditions may relate to channel quality or radio environment considerations observed by the UE 104, a throughput at the UE 104, a processing power available at the UE 104, a buffer status of the UE 104, etc.

In method 500, optionally at Block 510, an indication to send assistance information related to switching waveforms can be transmitted. In an aspect, assistance information component 352, e.g., in conjunction with processor(s) 312, memory 316, transceiver 302, BS communicating component 342, etc., can transmit the indication to send assistance information related to switching waveforms. For example, assistance information component 352 can transmit the indication to the UE 104, which can include transmitting a periodic trigger, as described above, conditions for event-based transmission, period information for a periodic report, etc.

In another example, the assistance information report may be explicitly or implicitly signaled. For example, assistance information component 352 can receive explicit assistance information from the UE 104 on an uplink channel, such as PUCCH, PUSCH, etc. In an example, assistance information component 352 can receive the assistance information as a standalone transmission over the uplink channel or multiplexed with other uplink communications, such as with existing CSI reports. In another example, assistance information component 352 can receive implicit assistance information as related to a specific uplink message or confirmation of an uplink message. For example, assistance information component 352 can determine specific resources or message contents of the message from the UE 104 to indicate the assistance information. In an example, assistance information component 352 can determine implicit assistance information by determining a specific PUCCH resource (e.g., time/frequency resources) over which PUCCH is received from the UE 104, a specific PRACH sequence or preamble received from the UE 104, etc. For example, the selection of PUCCH resources or PRACH sequence can be used to indicate a specific waveform to which switching is requested by the UE 104. Moreover, for example, assistance information component 352 can determine which PUCCH resources or PRACH sequences indicate which waveforms, etc. based on a configuration transmitted to the UE 104, based on a configuration stored in memory 316, etc.

In any case, in an example, based on receiving the assistance information, the base station 102 can switch to use the second waveform. In method 500, at Block 512, a second waveform can be switched to. In an aspect, waveform switching component 354, e.g., in conjunction with processor(s) 312, memory 316, transceiver 302, BS communicating component 342, etc., can switch to use a second waveform. For example, waveform switching component 354 can switch from the first waveform to the second waveform, which can include switching from one of OFDM, DFT-s-OFDM, SC-QAM, to another one of OFDM, DFT-s-OFDM, SC-QAM, etc. In an example, waveform switching component 354 can switch the transceiver 302 to use the second waveform in transmitting or receiving communications.

In an example in method 500, optionally at Block 514, an indication to switch to use the second waveform can be transmitted. In an aspect, waveform switching component 354, e.g., in conjunction with processor(s) 312, memory 316, transceiver 302, BS communicating component 342, etc., can transmit the indication to switch to use the second waveform (e.g., to the UE 104). For example, waveform switching component 354 can transmit the indication in DCI, MAC-CE, etc., where the indication may indicate to switch to the recommended waveform or may explicitly indicate a waveform to which to switch (e.g., where the base station 102 or other device can make the final decision on waveform). In an example, the indication may specify a time period for switching to the waveform, a time period to use the waveform (e.g., before switching back to another waveform), a backoff timer value for initializing the backoff timer for sending subsequent assistance information, etc. In any case, UE 104 can switch the waveform to use based on the received indication, in this example, as described.

In method 500, at Block 516, a second signal of the second waveform can be communicated in a second time period. In an aspect, BS communicating component 342, e.g., in conjunction with processor(s) 312, memory 316, transceiver 302, etc., can communicate the second signal of the second waveform in the second time period, similarly as described above with respect to Block 416 of method 400. In one example, BS communicating component 342 can communicate the second signal by transmitting the second signal of the second waveform to another device (e.g., a UE, etc.). In another example, BS communicating component 342 can communicate the second signal by receiving the second signal of the second waveform from another device (e.g., a UE, etc.). In an example, BS 102 can configure the other device with resources for communicating the second signal. Moreover, as described for example, the second waveform can include OFDM, DFT-s-OFDM, SC-QAM, etc., as described, and can be different than the first waveform.

Figure 6:
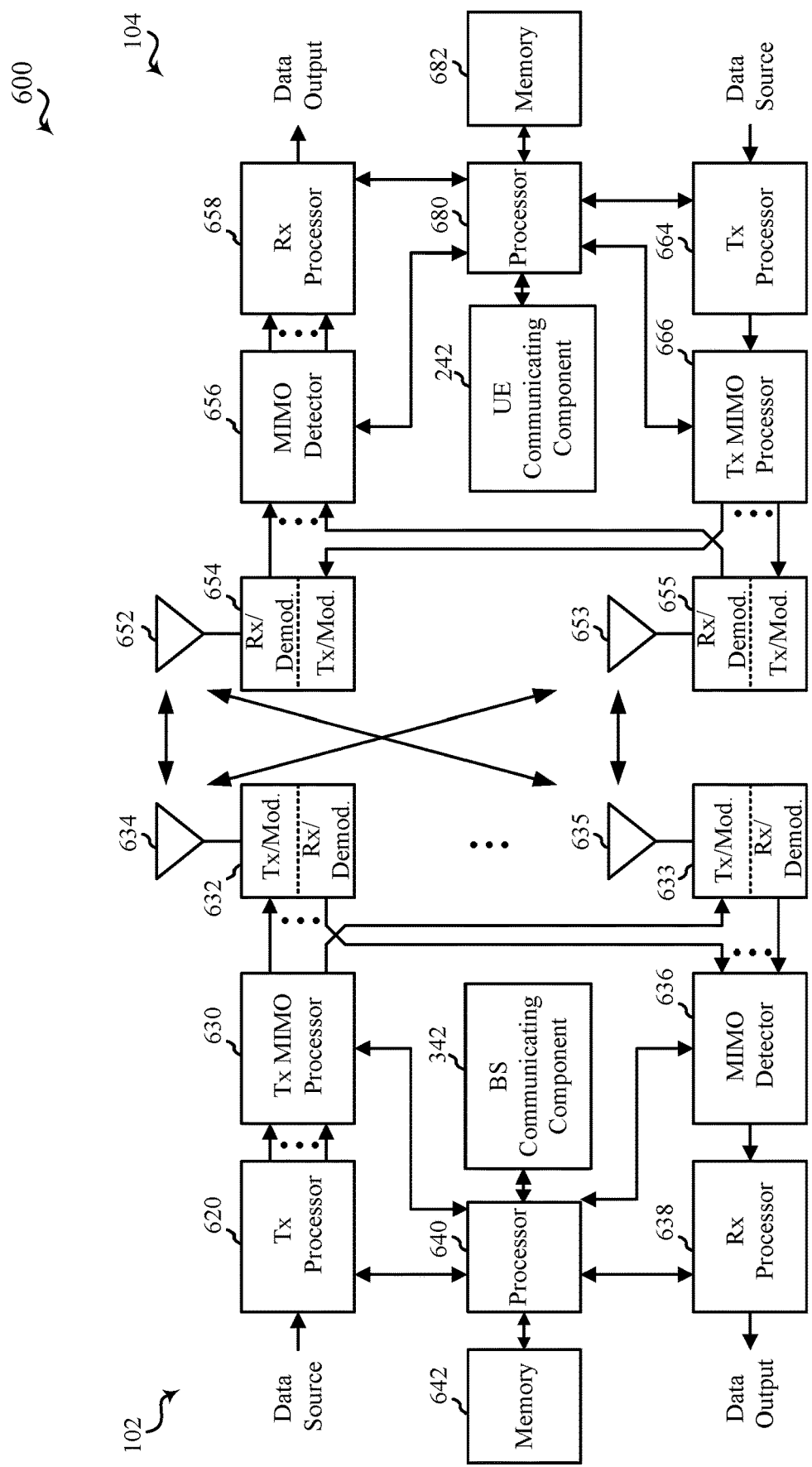
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a UE communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is an apparatus for wireless communication including a transceiver, a memory configured to store instructions, and one or more processors communicatively coupled with the memory and the transceiver. The one or more processors are configured to communicate, using the transceiver, a first signal of a first waveform in a first time period, transmit, to a base station, assistance information related to switching the transceiver to use a second waveform, switch, based at least in part on transmitting the assistance information, the transceiver to use a second waveform, and communicate, using the transceiver, a second signal of a second waveform in a second time period.

In Aspect 2, the apparatus of Aspect 1 includes where the one or more processors are further configured to receive, from the base station, an indication to switch to the second waveform, where the one or more processors are configured to switch the transceiver to use the second waveform further based on the indication.

In Aspect 3, the apparatus of any of Aspects 1 or 2 includes where the assistance information relates to switching to use the second waveform for one or more of uplink communications or downlink communications with the base station.

In Aspect 4, the apparatus of any of Aspects 1 to 3 includes where the one or more processors are configured to transmit the assistance information as an explicit indication of the second waveform.

In Aspect 5, the apparatus of Aspect 4 includes where the one or more processors are further configured to measure one or more signals received from the base station, and where the one or more processors are configured to transmit the assistance information based at least in part on the one or more measurements.

In Aspect 6, the apparatus of Aspect 5 includes where the one or more processors are further configured to receive, from the base station, a configuration indicating at least one metric or threshold of a signal parameter for transmitting the assistance information, where the one or more processors are configured to transmit the assistance information based at least in part on comparing the one or more measurements to the at least one metric or threshold.

In Aspect 7, the apparatus of any of Aspects 4 to 6 includes where the explicit indication indicates the second waveform along with one or more other waveforms for subsequent switching.

In Aspect 8, the apparatus of any of Aspects 1 to 3 includes where the one or more processors are further configured to measure one or more signals received from the base station, and where the assistance information includes one or more parameters of measuring the one or more signals.

In Aspect 9, the apparatus of Aspect 8 includes where the one or more parameters include a channel state information value, including a MIMO rank or a power headroom, an available processing power, or an adjacent channel leakage ratio.

In Aspect 10, the apparatus of any of Aspects 1 to 9 includes where the one or more processors are configured to transmit the assistance information in a periodic report.

In Aspect 11, the apparatus of any of Aspects 1 to 9 includes where the one or more processors are configured to transmit the assistance information in an aperiodic report based on a trigger received from the base station.

In Aspect 12, the apparatus of Aspect 11 includes where the one or more processors are further configured to receive the trigger from the base station in DCI or a MAC-CE.

In Aspect 13, the apparatus of any of Aspects 1 to 9 includes where the one or more processors are configured to transmit the assistance information over configured resources based on detecting occurrence of an event.

In Aspect 14, the apparatus of any of Aspects 1 to 13 includes where the one or more processors are configured to transmit the assistance information on an uplink control channel or uplink shared channel.

In Aspect 15, the apparatus of Aspect 14 includes where the one or more processors are configured to transmit the assistance information as multiplexed with a channel state information report over the uplink control channel or uplink shared channel.

In Aspect 16, the apparatus of any of Aspects 1 to 13 includes where the one or more processors are configured to transmit the assistance information by using specific uplink control channel resources or a specific physical random access channel sequence.

In Aspect 17, the apparatus of any of Aspects 1 to 16 includes where the one or more processors are configured to transmit the assistance information based on a backoff timer, where the one or more processors transmit the assistance information if the backoff timer is expired or do not transmit the assistance information if the backoff timer is not expired.

In Aspect 18, the apparatus of any of Aspects 1 to 17 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

Aspect 19 is an apparatus for wireless communication including a transceiver, a memory configured to store instructions, and one or more processors communicatively coupled with the memory and the transceiver. The one or more processors are configured to communicate, using the transceiver, a first signal of a first waveform in a first time period, receive, from a UE, assistance information related to switching the transceiver to use a second waveform, switch, based at least in part on receiving the assistance information, the transceiver to use a second waveform, and communicate, using the transceiver, a second signal of a second waveform in a second time period.

In Aspect 20, the apparatus of Aspect 19 includes where the one or more processors are further configured to transmit, to the UE, an indication to switch to the second waveform, where the one or more processors are configured to switch the transceiver to use the second waveform further based on the indication.

In Aspect 21, the apparatus of any of Aspects 19 or 20 includes where the assistance information relates to switching to use the second waveform for one or more of uplink communications or downlink communications with the UE.

In Aspect 22, the apparatus of any of Aspects 19 to 21 includes where the one or more processors are configured to receive the assistance information as an explicit indication of the second waveform.

In Aspect 23, the apparatus of Aspect 22 includes where the one or more processors are further configured to transmit, to the UE, a configuration indicating at least one metric or threshold of a signal parameter for transmitting the assistance information, where the one or more processors are configured to receive the assistance information based at least in part on transmitting the configuration.

In Aspect 24, the apparatus of any of Aspects 22 or 23 includes where the explicit indication indicates the second waveform along with one or more other waveforms for subsequent switching.

In Aspect 25, the apparatus of any of Aspects 19 to 21 includes where the assistance information includes one or more parameters of measuring one or more signals received by the UE, and where the one or more processors are further configured to transmit, to the UE, an indication to switch to the second waveform based on the one or more parameters.

In Aspect 26, the apparatus of Aspect 25 includes where the one or more parameters include a channel state information value, including a MIMO rank or a power headroom, an available processing power, or an adjacent channel leakage ratio.

In Aspect 27, the apparatus of any of Aspects 19 to 26 includes where the one or more processors are configured to receive the assistance information in a periodic report.

In Aspect 28, the apparatus of any of Aspects 19 to 26 includes where the one or more processors are further configured to transmit, to the UE, an indication of a trigger to send the assistance information as an aperiodic report, where the one or more processors are configured to receive the assistance information in the aperiodic report.

In Aspect 29, the apparatus of Aspect 28 includes where the one or more processors are further configured to transmit the trigger to the UE in DCI or a MAC-CE.

In Aspect 30, the apparatus of any of Aspects 19 to 26 includes where the one or more processors are configured to receive the assistance information over configured resources based on occurrence of an event.

In Aspect 31, the apparatus of any of Aspects 19 to 30 includes where the one or more processors are configured to receive the assistance information on an uplink control channel or uplink shared channel.

In Aspect 32, the apparatus of Aspect 31 includes where the one or more processors are configured to receive the assistance information as multiplexed with a channel state information report over the uplink control channel or uplink shared channel.

In Aspect 33, the apparatus of any of Aspects 19 to 30 includes where the one or more processors are configured to receive the assistance information as a specific uplink control channel resources or a specific physical random access channel sequence.

In Aspect 34, the apparatus of any of Aspects 19 to 33 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

Aspect 35 is a method for wireless communication including communicating, using a transceiver, a first signal of a first waveform in a first time period, transmitting, to a base station, assistance information related to switching the transceiver to use a second waveform, switching, based at least in part on transmitting the assistance information, the transceiver to use a second waveform, and communicating, using the transceiver, a second signal of a second waveform in a second time period.

In Aspect 36, the method of Aspect 35 includes receiving, from the base station, an indication to switch to the second waveform, where switching the transceiver to use the second waveform is further based on the indication.

In Aspect 37, the method of any of Aspects 35 or 36 includes where the assistance information relates to switching to use the second waveform for one or more of uplink communications or downlink communications with the base station.

In Aspect 38, the method of any of Aspects 35 to 37 includes where transmitting the assistance information includes transmitting the assistance information as an explicit indication of the second waveform.

In Aspect 39, the method of Aspect 38 includes measuring one or more signals received from the base station, and where transmitting the assistance information is based at least in part on the one or more measurements.

In Aspect 40, the method of Aspect 39 includes receiving, from the base station, a configuration indicating at least one metric or threshold of a signal parameter for transmitting the assistance information, where transmitting the assistance information is based at least in part on comparing the one or more measurements to the at least one metric or threshold.

In Aspect 41, the method of any of Aspects 38 to 40 includes where the explicit indication indicates the second waveform along with one or more other waveforms for subsequent switching.

In Aspect 42, the method of any of Aspects 35 to 37 includes measuring one or more signals received from the base station, where the assistance information includes one or more parameters of measuring the one or more signals.

In Aspect 43, the method of Aspect 42 includes where the one or more parameters include a channel state information value, including a MIMO rank or a power headroom, an available processing power, or an adjacent channel leakage ratio.

In Aspect 44, the method of any of Aspects 35 to 43 includes where transmitting the assistance information includes transmitting the assistance information in a periodic report.

In Aspect 45, the method of any of Aspects 35 to 43 includes where transmitting the assistance information includes transmitting the assistance information in an aperiodic report based on a trigger received from the base station.

In Aspect 46, the method of Aspect 45 includes receiving the trigger from the base station in DCI or a MAC-CE.

In Aspect 47, the method of any of Aspects 35 to 43 includes where transmitting the assistance information includes transmitting the assistance information over configured resources based on detecting occurrence of an event.

In Aspect 48, the method of any of Aspects 35 to 47 includes where transmitting the assistance information includes transmitting the assistance information on an uplink control channel or uplink shared channel.

In Aspect 49, the method of Aspect 48 includes where transmitting the assistance information includes transmitting the assistance information as multiplexed with a channel state information report over the uplink control channel or uplink shared channel.

In Aspect 50, the method of any of Aspects 35 to 47 includes where transmitting the assistance information includes transmitting the assistance information by using specific uplink control channel resources or a specific physical random access channel sequence.

In Aspect 51, the method of any of Aspects 35 to 50 includes where transmitting the assistance information includes transmitting the assistance information based on a backoff timer including transmitting the assistance information if the backoff timer is expired or not transmitting the assistance information if the backoff timer is not expired.

In Aspect 52, the method of any of Aspects 35 to 51 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

Aspect 53 is a method for wireless communication including communicating, using a transceiver, a first signal of a first waveform in a first time period, receiving, from a UE, assistance information related to switching the transceiver to use a second waveform, switching, based at least in part on receiving the assistance information, the transceiver to use a second waveform, and communicating, using the transceiver, a second signal of a second waveform in a second time period.

In Aspect 54, the method of Aspect 53 includes transmitting, to the UE, an indication to switch to the second waveform, where switching the transceiver to use the second waveform is further based on the indication.

In Aspect 55, the method of any of Aspects 53 or 54 includes where the assistance information relates to switching to use the second waveform for one or more of uplink communications or downlink communications with the UE.

In Aspect 56, the method of any of Aspects 53 to 55 includes where receiving the assistance information includes receiving the assistance information as an explicit indication of the second waveform.

In Aspect 57, the method of Aspect 56 includes transmitting, to the UE, a configuration indicating at least one metric or threshold of a signal parameter for transmitting the assistance information, where receiving the assistance information includes receiving the assistance information based at least in part on transmitting the configuration.

In Aspect 58, the method of any of Aspects 56 or 57 includes where the explicit indication indicates the second waveform along with one or more other waveforms for subsequent switching.

In Aspect 59, the method of any of Aspects 53 to 55 includes where the assistance information includes one or more parameters of measuring one or more signals received by the UE, and further comprising transmitting, to the UE, an indication to switch to the second waveform based on the one or more parameters.

In Aspect 60, the method of Aspect 59 includes where the one or more parameters include a channel state information value, including a MIMO rank or a power headroom, an available processing power, or an adjacent channel leakage ratio.

In Aspect 61, the method of any of Aspects 53 to 60 includes where receiving the assistance information includes receiving the assistance information in a periodic report.

In Aspect 62, the method of any of Aspects 53 to 60 includes transmitting, to the UE, an indication of a trigger to send the assistance information as an aperiodic report, where receiving the assistance information includes receiving the assistance information in the aperiodic report.

In Aspect 63, the method of Aspect 62 includes transmitting the trigger to the UE in DCI or a MAC-CE.

In Aspect 64, the method of any of Aspects 53 to 60 includes where receiving the assistance information includes receiving the assistance information over configured resources based on occurrence of an event.

In Aspect 65, the method of any of Aspects 53 to 64 includes where receiving the assistance information includes receiving the assistance information on an uplink control channel or uplink shared channel.

In Aspect 66, the method of Aspect 65 includes where receiving the assistance information includes receiving the assistance information as multiplexed with a channel state information report over the uplink control channel or uplink shared channel.

In Aspect 67, the method of any of Aspects 53 to 64 includes where receiving the assistance information includes receiving the assistance information as a specific uplink control channel resources or a specific physical random access channel sequence.

In Aspect 68, the method of any of Aspects 53 to 67 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

Aspect 69 is an apparatus for wireless communication including means for communicating, using a transceiver, a first signal of a first waveform in a first time period, means for transmitting, to a base station, assistance information related to switching the transceiver to use a second waveform, means for switching, based at least in part on transmitting the assistance information, the transceiver to use a second waveform, and means for communicating, using the transceiver, a second signal of a second waveform in a second time period.

In Aspect 70, the apparatus of Aspect 69 includes means for receiving, from the base station, an indication to switch to the second waveform, where the means for switching switches the transceiver to use the second waveform is further based on the indication.

In Aspect 71, the apparatus of any of Aspects 69 or 70 includes where the assistance information relates to switching to use the second waveform for one or more of uplink communications or downlink communications with the base station.

In Aspect 72, the apparatus of any of Aspects 69 to 71 includes where the means for transmitting the assistance information transmits the assistance information as an explicit indication of the second waveform.

In Aspect 73, the apparatus of Aspect 72 includes means for measuring one or more signals received from the base station, and where the means for transmitting the assistance information transmits the assistance information based at least in part on the one or more measurements.

In Aspect 74, the apparatus of Aspect 73 includes means for receiving, from the base station, a configuration indicating at least one metric or threshold of a signal parameter for transmitting the assistance information, where the means for transmitting the assistance information transmits the assistance information based at least in part on comparing the one or more measurements to the at least one metric or threshold.

In Aspect 75, the apparatus of any of Aspects 72 to 74 includes where the explicit indication indicates the second waveform along with one or more other waveforms for subsequent switching.

In Aspect 76, the apparatus of any of Aspects 69 to 71 includes means for measuring one or more signals received from the base station, where the assistance information includes one or more parameters of measuring the one or more signals.

In Aspect 77, the apparatus of Aspect 76 includes where the one or more parameters include a channel state information value, including a MIMO rank or a power headroom, an available processing power, or an adjacent channel leakage ratio.

In Aspect 78, the apparatus of any of Aspects 69 to 77 includes where the means for transmitting the assistance information transmits the assistance information in a periodic report.

In Aspect 79, the apparatus of any of Aspects 69 to 77 includes where the means for transmitting the assistance information transmits the assistance information in an aperiodic report based on a trigger received from the base station.

In Aspect 80, the apparatus of Aspect 79 includes means for receiving the trigger from the base station in DCI or a MAC-CE.

In Aspect 81, the apparatus of any of Aspects 69 to 77 includes where the means for transmitting the assistance information transmits the assistance information over configured resources based on detecting occurrence of an event.

In Aspect 82, the apparatus of any of Aspects 69 to 81 includes where the means for transmitting the assistance information transmits the assistance information on an uplink control channel or uplink shared channel.

In Aspect 83, the apparatus of Aspect 82 includes where the means for transmitting the assistance information transmits the assistance information as multiplexed with a channel state information report over the uplink control channel or uplink shared channel.

In Aspect 84, the apparatus of any of Aspects 69 to 81 includes where the means for transmitting the assistance information transmits the assistance information by using specific uplink control channel resources or a specific physical random access channel sequence.

In Aspect 85, the apparatus of any of Aspects 69 to 84 includes where the means for transmitting the assistance information transmits the assistance information based on a backoff timer including transmitting the assistance information if the backoff timer is expired or not transmitting the assistance information if the backoff timer is not expired.

In Aspect 86, the apparatus of any of Aspects 69 to 85 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

Aspect 87 is an apparatus for wireless communication including means for communicating, using a transceiver, a first signal of a first waveform in a first time period, means for receiving, from a UE, assistance information related to switching the transceiver to use a second waveform, means for switching, based at least in part on receiving the assistance information, the transceiver to use a second waveform, and means for communicating, using the transceiver, a second signal of a second waveform in a second time period.

In Aspect 88, the apparatus of Aspect 87 includes means for transmitting, to the UE, an indication to switch to the second waveform, where the means for switching switches the transceiver to use the second waveform is further based on the indication.

In Aspect 89, the apparatus of any of Aspects 87 or 88 includes where the assistance information relates to switching to use the second waveform for one or more of uplink communications or downlink communications with the UE.

In Aspect 90, the apparatus of any of Aspects 87 to 89 includes where the means for receiving the assistance information receives the assistance information as an explicit indication of the second waveform.

In Aspect 91, the apparatus of Aspect 90 includes means for transmitting, to the UE, a configuration indicating at least one metric or threshold of a signal parameter for transmitting the assistance information, where the means for receiving the assistance information receives the assistance information based at least in part on transmitting the configuration.

In Aspect 92, the apparatus of any of Aspects 90 or 91 includes where the explicit indication indicates the second waveform along with one or more other waveforms for subsequent switching.

In Aspect 93, the apparatus of any of Aspects 87 to 89 includes where the assistance information includes one or more parameters of measuring one or more signals received by the UE, and further comprising means for transmitting, to the UE, an indication to switch to the second waveform based on the one or more parameters.

In Aspect 94, the apparatus of Aspect 93 includes where the one or more parameters include a channel state information value, including a MIMO rank or a power headroom, an available processing power, or an adjacent channel leakage ratio.

In Aspect 95, the apparatus of any of Aspects 87 to 94 includes where the means for receiving the assistance information receives the assistance information in a periodic report.

In Aspect 96, the apparatus of any of Aspects 87 to 94 includes means for transmitting, to the UE, an indication of a trigger to send the assistance information as an aperiodic report, where the means for receiving the assistance information receives the assistance information in the aperiodic report.

In Aspect 97, the apparatus of Aspect 96 includes means for transmitting the trigger to the UE in DCI or a MAC-CE.

In Aspect 98, the apparatus of any of Aspects 87 to 94 includes where the means for receiving the assistance information receives the assistance information over configured resources based on occurrence of an event.

In Aspect 99, the apparatus of any of Aspects 87 to 98 includes where the means for receiving the assistance information receives the assistance information on an uplink control channel or uplink shared channel.

In Aspect 100, the apparatus of Aspect 99 includes where the means for receiving the assistance information receives the assistance information as multiplexed with a channel state information report over the uplink control channel or uplink shared channel.

In Aspect 101, the apparatus of any of Aspects 87 to 98 includes where the means for receiving the assistance information receives the assistance information as a specific uplink control channel resources or a specific physical random access channel sequence.

In Aspect 102, the apparatus of any of Aspects 87 to 101 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

Aspect 103 is a computer-readable medium including code executable by one or more processors for wireless communication. The code includes code for communicating, using a transceiver, a first signal of a first waveform in a first time period, transmitting, to a base station, assistance information related to switching the transceiver to use a second waveform, switching, based at least in part on transmitting the assistance information, the transceiver to use a second waveform, and communicating, using the transceiver, a second signal of a second waveform in a second time period.

In Aspect 104, the computer-readable medium of Aspect 103 includes code for receiving, from the base station, an indication to switch to the second waveform, where the code for switching switches the transceiver to use the second waveform is further based on the indication.

In Aspect 105, the computer-readable medium of any of Aspects 103 or 104 includes where the assistance information relates to switching to use the second waveform for one or more of uplink communications or downlink communications with the base station.

In Aspect 106, the computer-readable medium of any of Aspects 103 to 105 includes where the code for transmitting the assistance information transmits the assistance information as an explicit indication of the second waveform.

In Aspect 107, the computer-readable medium of Aspect 106 includes code for measuring one or more signals received from the base station, and where the code for transmitting the assistance information transmits the assistance information based at least in part on the one or more measurements.

In Aspect 108, the computer-readable medium of Aspect 107 includes code for receiving, from the base station, a configuration indicating at least one metric or threshold of a signal parameter for transmitting the assistance information, where the code for transmitting the assistance information transmits the assistance information based at least in part on comparing the one or more measurements to the at least one metric or threshold.

In Aspect 109, the computer-readable medium of any of Aspects 106 to 108 includes where the explicit indication indicates the second waveform along with one or more other waveforms for subsequent switching.

In Aspect 110, the computer-readable medium of any of Aspects 103 to 105 includes code for measuring one or more signals received from the base station, where the assistance information includes one or more parameters of measuring the one or more signals.

In Aspect 111, the computer-readable medium of Aspect 110 includes where the one or more parameters include a channel state information value, including a MIMO rank or a power headroom, an available processing power, or an adjacent channel leakage ratio.

In Aspect 112, the computer-readable medium of any of Aspects 103 to 111 includes where the code for transmitting the assistance information transmits the assistance information in a periodic report.

In Aspect 113, the computer-readable medium of any of Aspects 103 to 111 includes where the code for transmitting the assistance information transmits the assistance information in an aperiodic report based on a trigger received from the base station.

In Aspect 114, the computer-readable medium of Aspect 113 includes code for receiving the trigger from the base station in DCI or a MAC-CE.

In Aspect 115, the computer-readable medium of any of Aspects 103 to 111 includes where the code for transmitting the assistance information transmits the assistance information over configured resources based on detecting occurrence of an event.

In Aspect 116, the computer-readable medium of any of Aspects 103 to 115 includes where the code for transmitting the assistance information transmits the assistance information on an uplink control channel or uplink shared channel.

In Aspect 117, the computer-readable medium of Aspect 116 includes where the code for transmitting the assistance information transmits the assistance information as multiplexed with a channel state information report over the uplink control channel or uplink shared channel.

In Aspect 118, the computer-readable medium of any of Aspects 103 to 115 includes where the code for transmitting the assistance information transmits the assistance information by using specific uplink control channel resources or a specific physical random access channel sequence.

In Aspect 119, the computer-readable medium of any of Aspects 103 to 118 includes where the code for transmitting the assistance information transmits the assistance information based on a backoff timer including transmitting the assistance information if the backoff timer is expired or not transmitting the assistance information if the backoff timer is not expired.

In Aspect 120, the computer-readable medium of any of Aspects 103 to 119 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

Aspect 121 is a computer-readable medium including code executable by one or more processors for wireless communication. The code includes code for communicating, using a transceiver, a first signal of a first waveform in a first time period, receiving, from a UE, assistance information related to switching the transceiver to use a second waveform, switching, based at least in part on receiving the assistance information, the transceiver to use a second waveform, and communicating, using the transceiver, a second signal of a second waveform in a second time period.

In Aspect 122, the computer-readable medium of Aspect 121 includes code for transmitting, to the UE, an indication to switch to the second waveform, where the code for switching switches the transceiver to use the second waveform is further based on the indication.

In Aspect 123, the computer-readable medium of any of Aspects 121 or 122 includes where the assistance information relates to switching to use the second waveform for one or more of uplink communications or downlink communications with the UE.

In Aspect 124, the computer-readable medium of any of Aspects 121 to 123 includes where the code for receiving the assistance information receives the assistance information as an explicit indication of the second waveform.

In Aspect 125, the computer-readable medium of Aspect 124 includes code for transmitting, to the UE, a configuration indicating at least one metric or threshold of a signal parameter for transmitting the assistance information, where the code for receiving the assistance information receives the assistance information based at least in part on transmitting the configuration.

In Aspect 126, the computer-readable medium of any of Aspects 124 or 125 includes where the explicit indication indicates the second waveform along with one or more other waveforms for subsequent switching.

In Aspect 127, the computer-readable medium of any of Aspects 121 to 123 includes where the assistance information includes one or more parameters of measuring one or more signals received by the UE, and further comprising code for transmitting, to the UE, an indication to switch to the second waveform based on the one or more parameters.

In Aspect 128, the computer-readable medium of Aspect 127 includes where the one or more parameters include a channel state information value, including a MIMO rank or a power headroom, an available processing power, or an adjacent channel leakage ratio.

In Aspect 129, the computer-readable medium of any of Aspects 121 to 128 includes where the code for receiving the assistance information receives the assistance information in a periodic report.

In Aspect 130, the computer-readable medium of any of Aspects 121 to 128 includes code for transmitting, to the UE, an indication of a trigger to send the assistance information as an aperiodic report, where the code for receiving the assistance information receives the assistance information in the aperiodic report.

In Aspect 131, the computer-readable medium of Aspect 130 includes code for transmitting the trigger to the UE in DCI or a MAC-CE.

In Aspect 132, the computer-readable medium of any of Aspects 121 to 128 includes where the code for receiving the assistance information receives the assistance information over configured resources based on occurrence of an event.

In Aspect 133, the computer-readable medium of any of Aspects 121 to 132 includes where the code for receiving the assistance information receives the assistance information on an uplink control channel or uplink shared channel.

In Aspect 134, the computer-readable medium of Aspect 133 includes where the code for receiving the assistance information receives the assistance information as multiplexed with a channel state information report over the uplink control channel or uplink shared channel.

In Aspect 135, the computer-readable medium of any of Aspects 121 to 132 includes where the code for receiving the assistance information receives the assistance information as a specific uplink control channel resources or a specific physical random access channel sequence.

In Aspect 136, the computer-readable medium of any of Aspects 121 to 135 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to:
      communicate, using the transceiver, a first signal of a first waveform in a first time period, wherein the first waveform is generated based on a transform of first data modulated symbols into the first waveform, or the first waveform is processed to recover the first data modulated symbols from the first waveform;
      transmit, to a base station, assistance information related to switching the transceiver to use a second waveform, wherein the assistance information includes an explicit indication of the second waveform, and wherein the second waveform is generated based on a transform of second data modulated symbols into the second waveform, or the second waveform is processed to recover the second data modulated symbols from the second waveform, wherein the assistance information includes the explicit indication of multiple waveforms, including the second waveform, to which to switch in a specific recommended order;
      receive, from the base station and based at least in part on transmitting the assistance information, an indication to switch to the second waveform;
      switch, based at least in part on receiving the indication, the transceiver to use the second waveform; and
      communicate, using the transceiver, a second signal of the second waveform in a second time period.

2. The apparatus of claim 1, wherein the assistance information relates to switching to use the second waveform for one or more of uplink communications or downlink communications with the base station.

3. The apparatus of claim 1, wherein the one or more processors are further configured to perform one or more measurements of one or more signals received from the base station, and wherein the one or more processors are configured to transmit the assistance information based at least in part on the one or more measurements.

4. The apparatus of claim 3, wherein the one or more processors are further configured to receive, from the base station, a configuration indicating at least one metric or threshold of a signal parameter for transmitting the assistance information, wherein the one or more processors are configured to transmit the assistance information based at least in part on comparing the one or more measurements to the at least one metric or threshold.

5. The apparatus of claim 1, wherein the assistance information further identifies one or more other waveforms for subsequent switching.

6. The apparatus of claim 1, wherein the one or more processors are further configured to measure one or more signals received from the base station, and wherein the assistance information includes one or more parameters of measuring the one or more signals.

7. The apparatus of claim 6, wherein the one or more parameters include a channel state information value, including a multiple-input multiple-output (MIMO) rank or a power headroom, an available processing power, or an adjacent channel leakage ratio.

8. The apparatus of claim 1, wherein the one or more processors are configured to transmit the assistance information in a periodic report.

9. The apparatus of claim 1, wherein the one or more processors are configured to transmit the assistance information in an aperiodic report based on a trigger received from the base station.

10. The apparatus of claim 9, wherein the one or more processors are further configured to receive the trigger from the base station in downlink control information (DCI) or a media access control (MAC)-control element (CE).

11. The apparatus of claim 1, wherein the one or more processors are configured to transmit the assistance information over configured resources based on detecting occurrence of an event.

12. The apparatus of claim 1, wherein the one or more processors are configured to transmit the assistance information on an uplink control channel or uplink shared channel.

13. The apparatus of claim 12, wherein the one or more processors are configured to transmit the assistance information as multiplexed with a channel state information report over the uplink control channel or uplink shared channel.

14. The apparatus of claim 1, wherein the one or more processors are configured to transmit the assistance information by using specific uplink control channel resources or a specific physical random access channel sequence.

15. The apparatus of claim 1, wherein the one or more processors are configured to transmit the assistance information based on a backoff timer, wherein the one or more processors transmit the assistance information if the backoff timer is expired or do not transmit the assistance information if the backoff timer is not expired.

16. The apparatus of claim 1, wherein the first waveform is one of an orthogonal frequency division multiplexing (OFDM) waveform, a discrete Fourier transform-spread-OFDM (DFT-s-OFDM) waveform, or a single carrier-quadrature amplitude modulation (SC-QAM) waveform, and wherein the second waveform is a different one of the OFDM waveform, the DFT-s-OFDM waveform, or the SC-QAM waveform.

17. An apparatus for wireless communication, comprising:
a transceiver;
a memory configured to store instructions; and
one or more processors communicatively coupled with the memory and the transceiver, wherein the one or more processors are configured to:
communicate, using the transceiver, a first signal of a first waveform in a first time period, wherein the first waveform is generated based on a transform of first data modulated symbols into the first waveform, or the first waveform is processed to recover the first data modulated symbols from the first waveform;
receive, from a user equipment (UE), assistance information related to switching the transceiver to use a second waveform, wherein the assistance information includes an explicit indication of the second waveform, and wherein the second waveform is generated based on a transform of second data modulated symbols into the second waveform, or the second waveform is processed to recover the second data modulated symbols from the second waveform, wherein the assistance information includes the explicit indication of multiple waveforms, including the second waveform, to which to switch in a specific recommended order;
transmit, to the UE and based at least in part on the assistance information, an indication to switch to the second waveform;
switch, based at least in part on transmitting the indication, the transceiver to use the second waveform; and
communicate, using the transceiver, a second signal of the second waveform in a second time period.

18. The apparatus of claim 17, wherein the assistance information relates to switching to use the second waveform for one or more of uplink communications or downlink communications with the UE.

19. The apparatus of claim 17, wherein the one or more processors are configured to receive the assistance information in a periodic report, an aperiodic report, or an event-based report.

20. The apparatus of claim 17, wherein the one or more processors are configured to receive the assistance information on an uplink control channel or uplink shared channel.

21. A method for wireless communication, comprising:
communicating, using a transceiver, a first signal of a first waveform in a first time period, wherein the first waveform is generated based on a transform of first data modulated symbols into the first waveform, or the first waveform is processed to recover the first data modulated symbols from the first waveform;
transmitting, to a base station, assistance information related to switching the transceiver to use a second waveform, wherein the assistance information includes an explicit indication of the second waveform, and wherein the second waveform is generated based on a transform of second data modulated symbols into the second waveform, or the second waveform is processed to recover the second data modulated symbols from the second waveform, wherein the assistance information includes the explicit indication of multiple waveforms, including the second waveform, to which to switch in a specific recommended order;
receiving, from the base station, an indication to switch to the second waveform;
switching, based at least in part on receiving the indication, the transceiver to use the second waveform; and
communicating, using the transceiver, a second signal of the second waveform in a second time period.

22. The method of claim 21, wherein the assistance information relates to switching to use the second waveform for one or more of uplink communications or downlink communications with the base station.

23. A method for wireless communication, comprising:
communicating, using a transceiver, a first signal of a first waveform in a first time period, wherein the first waveform is generated based on a transform of first data modulated symbols into the first waveform, or the first waveform is processed to recover the first data modulated symbols from the first waveform;
receiving, from a user equipment (UE), assistance information related to switching the transceiver to use a second waveform, wherein the assistance information includes an explicit indication of the second waveform, and wherein the second waveform is generated based on a transform of second data modulated symbols into the second waveform, or the second waveform is processed to recover the second data modulated symbols from the second waveform, wherein the assistance information includes the explicit indication of multiple waveforms, including the second waveform, to which to switch in a specific recommended order;

transmitting, to the UE and based at least in part on the assistance information, an indication to switch to the second waveform;

switching, based at least in part on transmitting the indication, the transceiver to use the second waveform; and communicating, using the transceiver, a second signal of the second waveform in a second time period.

24. The method of claim 21, further comprising performing one or more measurements of one or more signals received from the base station, and wherein transmitting the assistance information is based at least in part on the one or more measurements.

25. The method of claim 24, further comprising receiving, from the base station, a configuration indicating at least one metric or threshold of a signal parameter for transmitting the assistance information, wherein transmitting the assistance information is based at least in part on comparing the one or more measurements to the at least one metric or threshold.

26. The method of claim 21, wherein the assistance information further identifies one or more other waveforms for subsequent switching.

27. The method of claim 21, further comprising measuring one or more signals received from the base station, and wherein the assistance information includes one or more parameters of measuring the one or more signals.

28. The method of claim 27, wherein the one or more parameters include a channel state information value, including a multiple-input multiple-output (MIMO) rank or a power headroom, an available processing power, or an adjacent channel leakage ratio.

29. The method of claim 21, wherein transmitting the assistance information includes transmitting the assistance information in a periodic report.

30. The method of claim 23, wherein the assistance information relates to switching to use the second waveform for one or more of uplink communications or downlink communications with the UE.

* * * * *